United States Patent Office 3,605,962
Patented Sept. 20, 1971

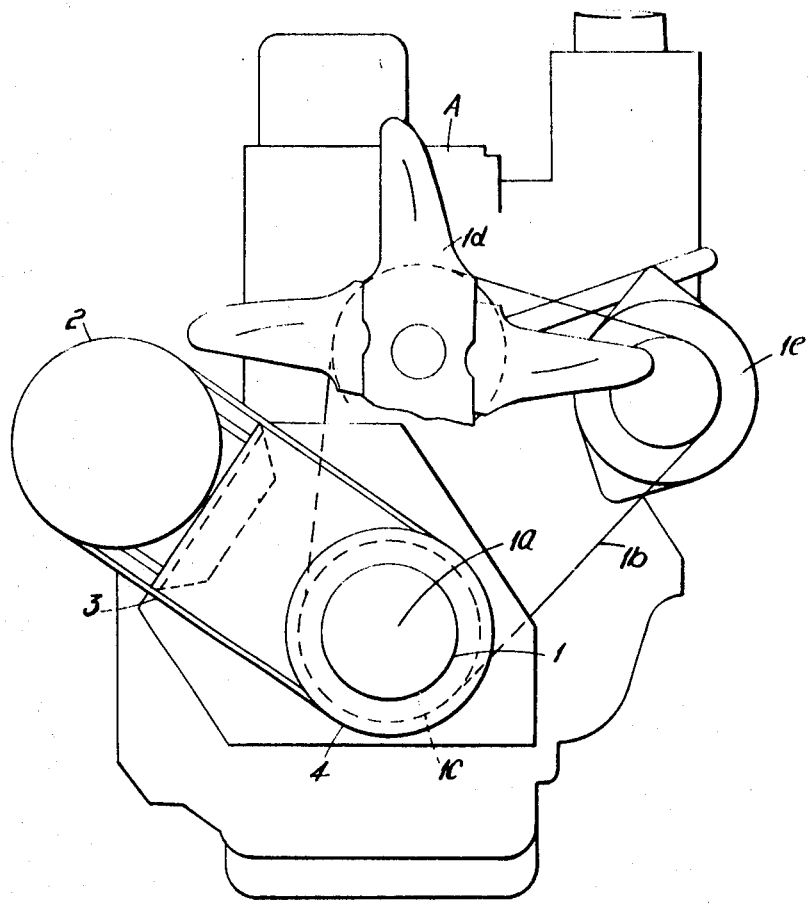

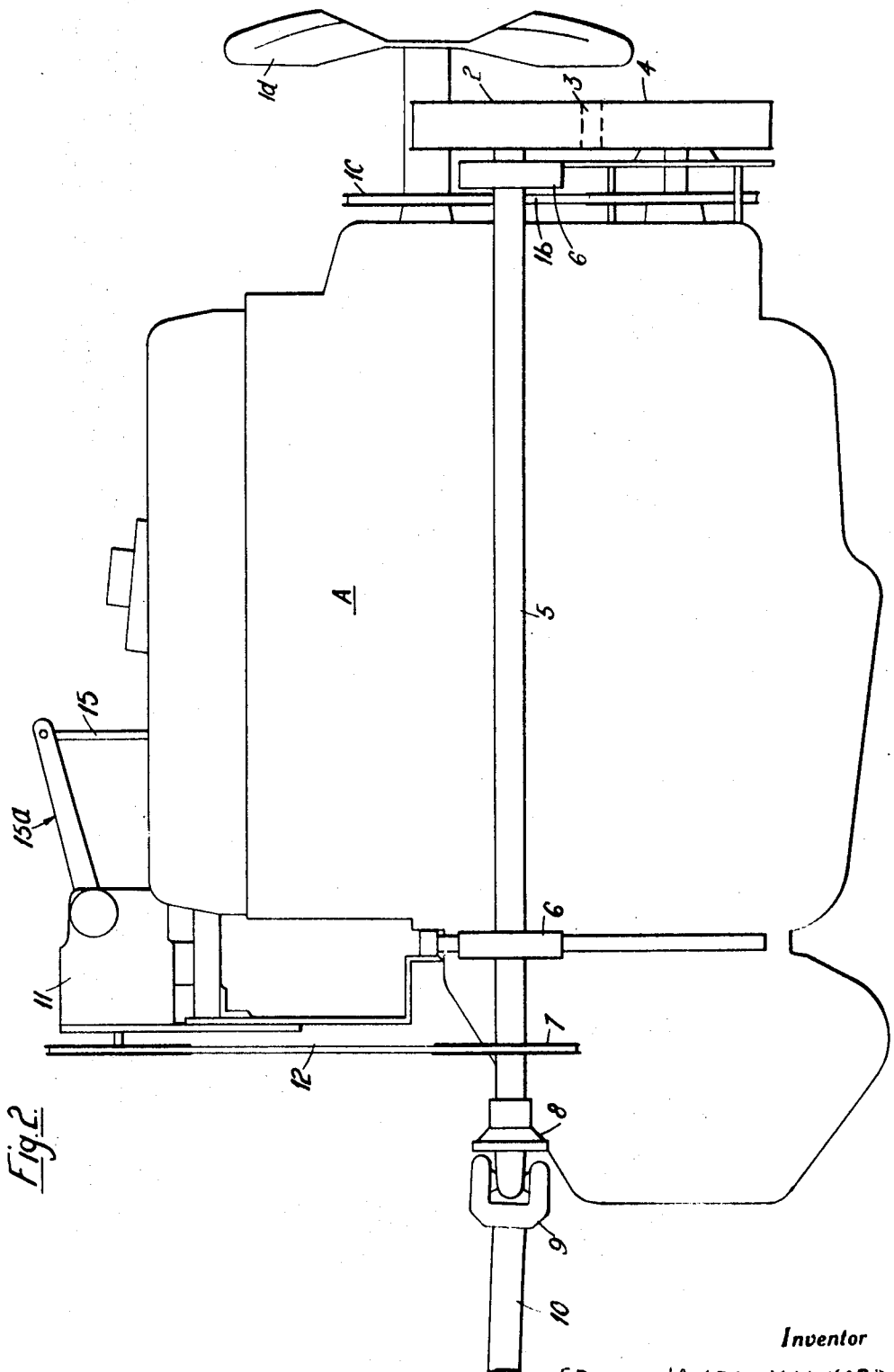

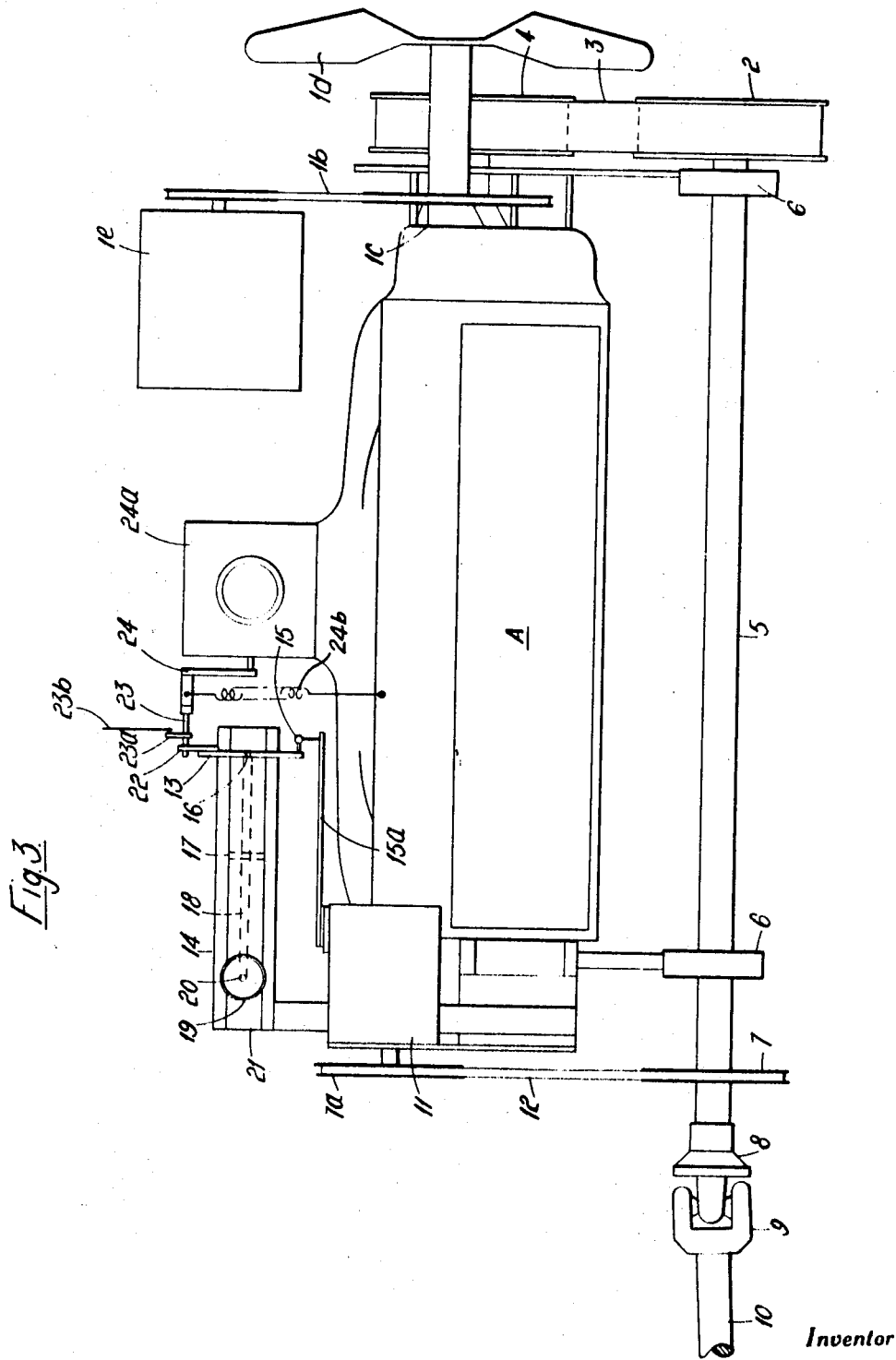

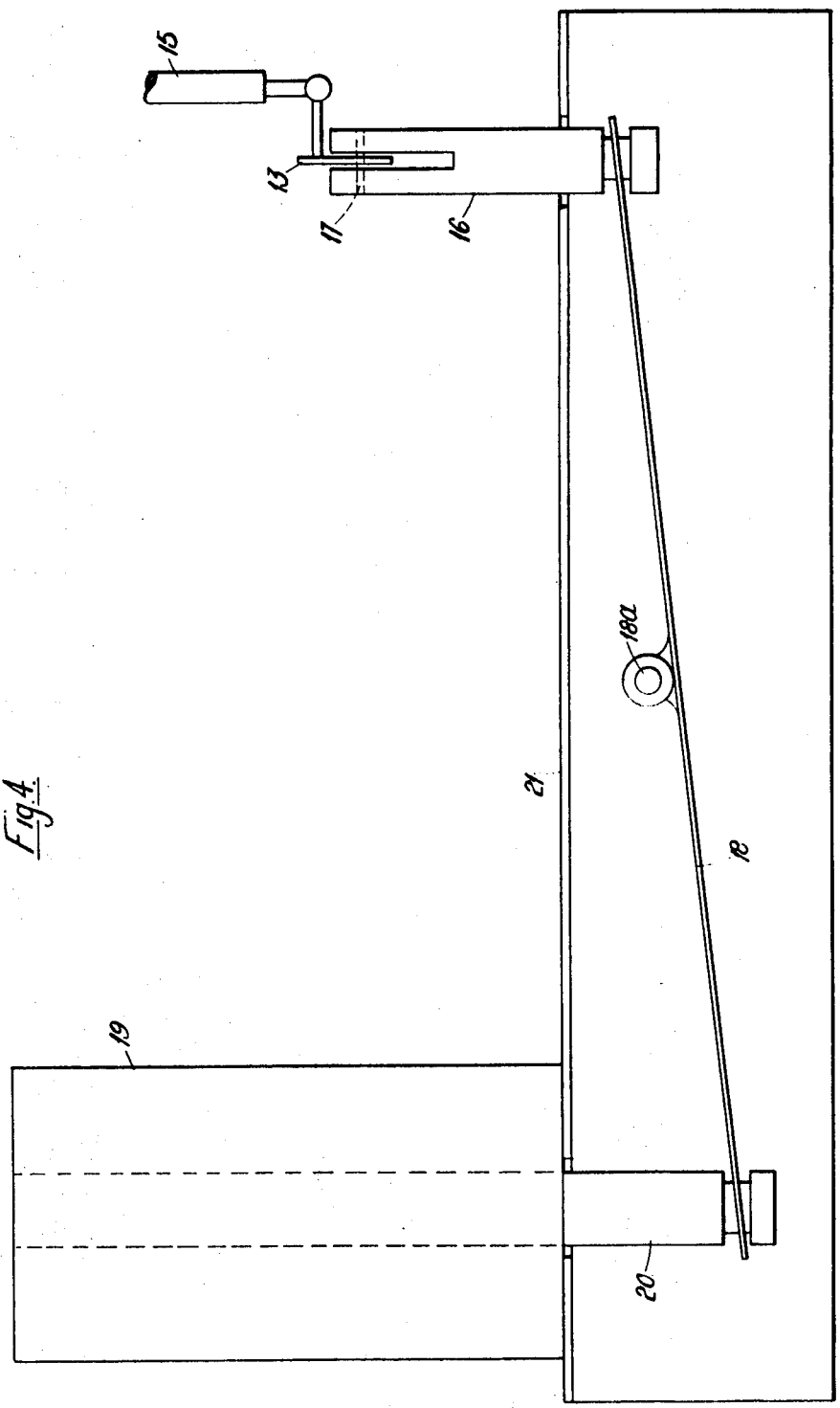

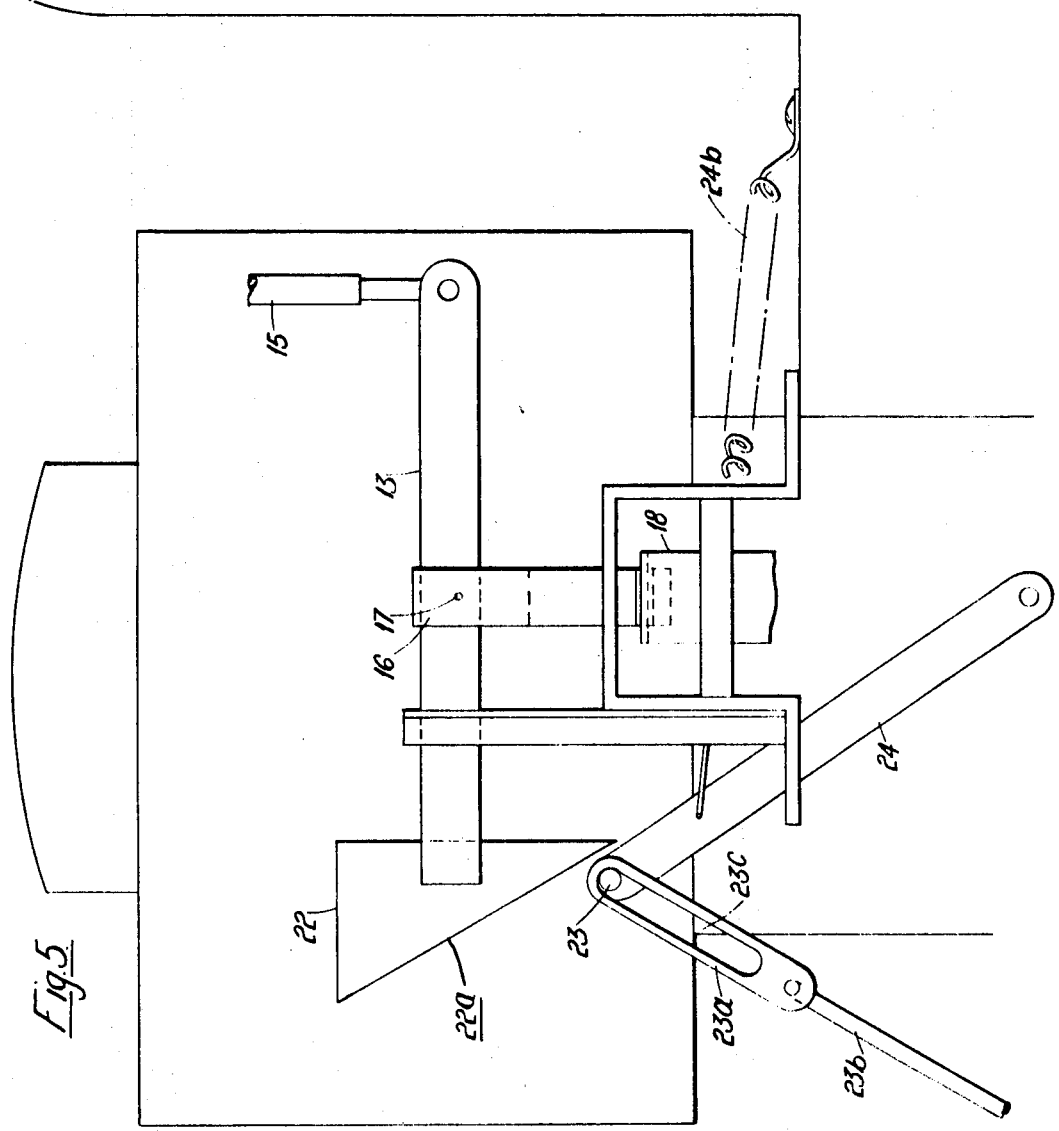

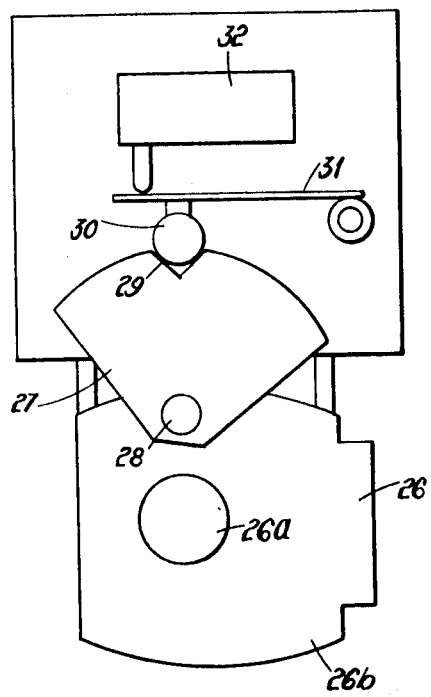

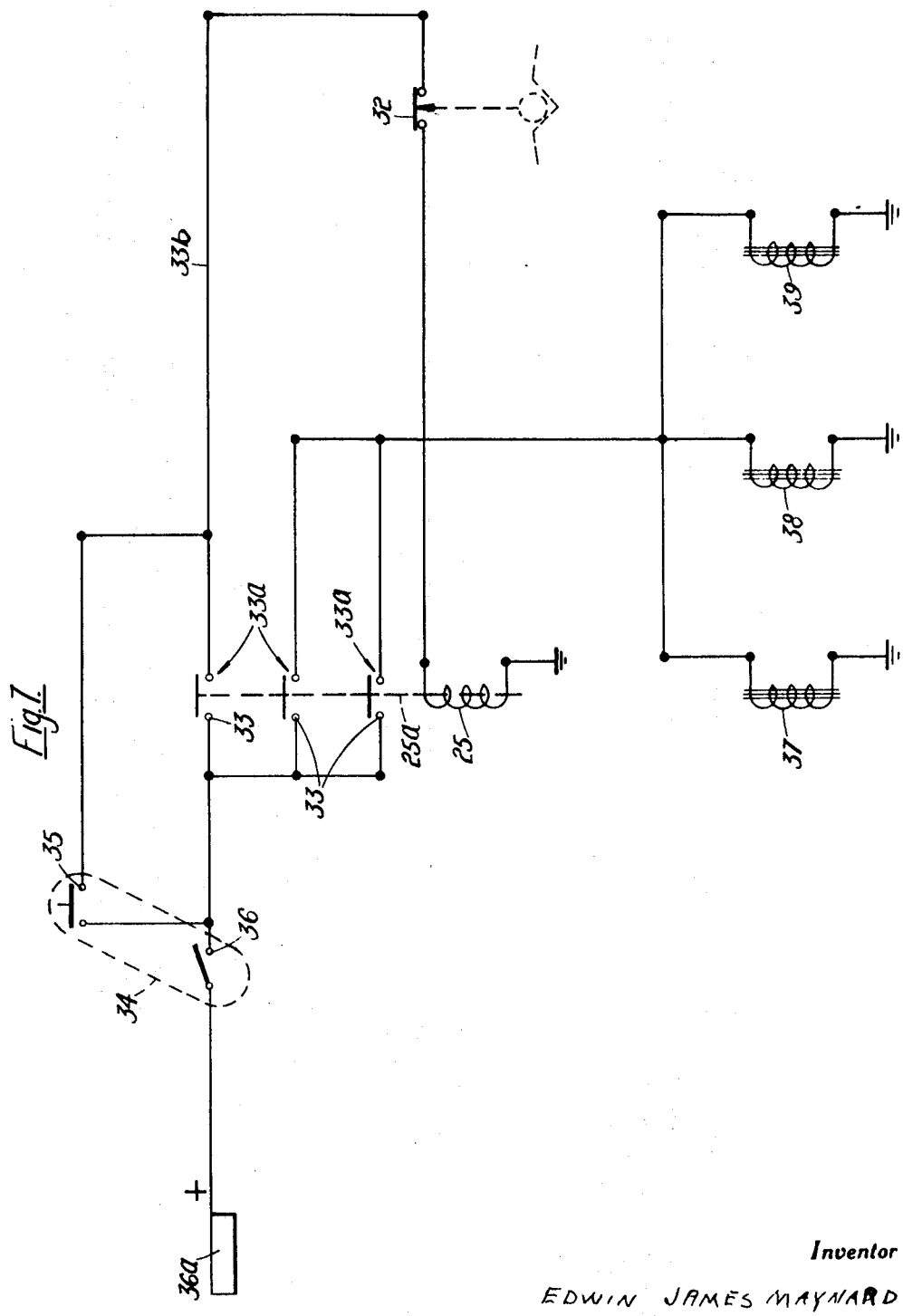

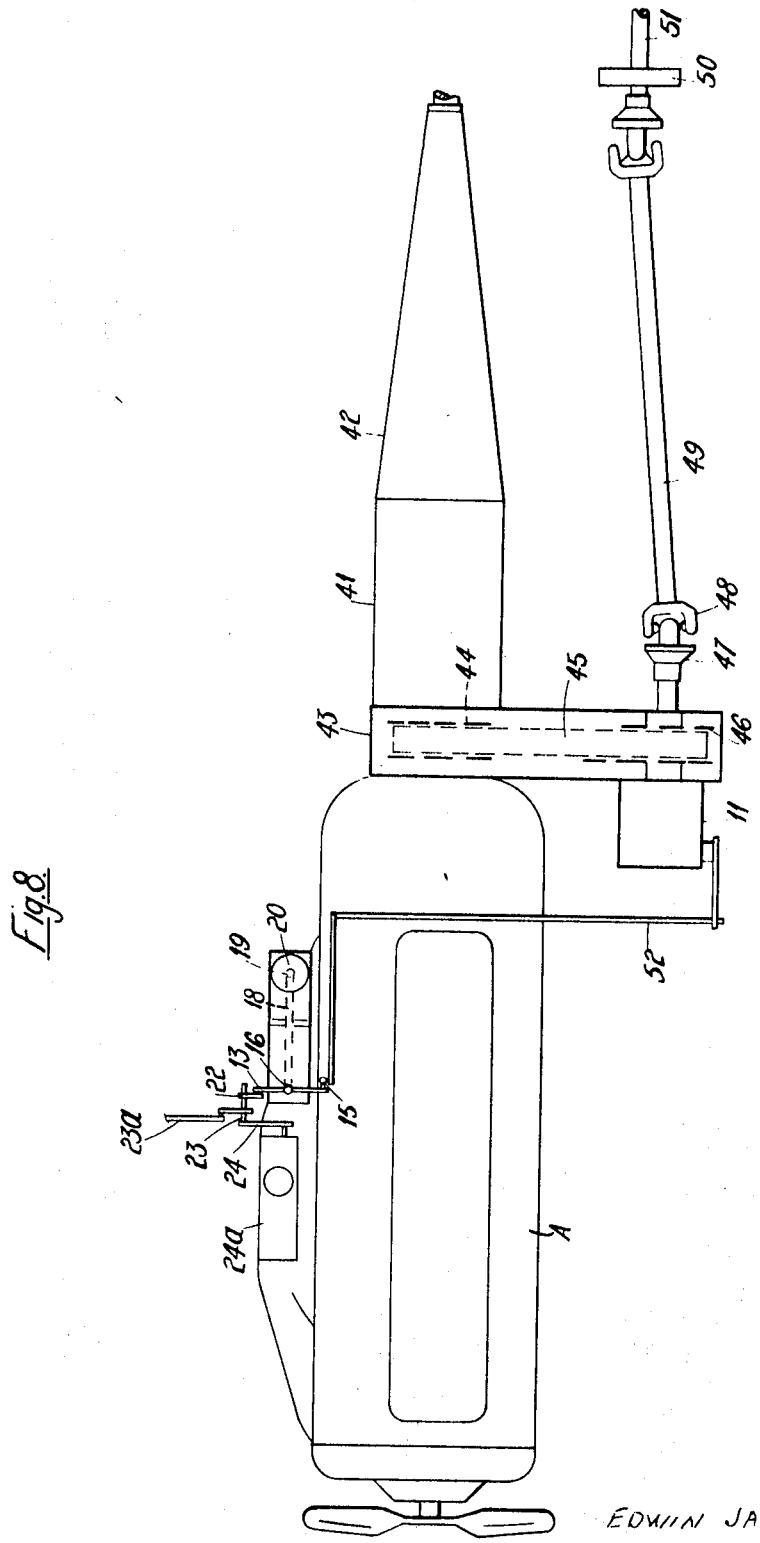

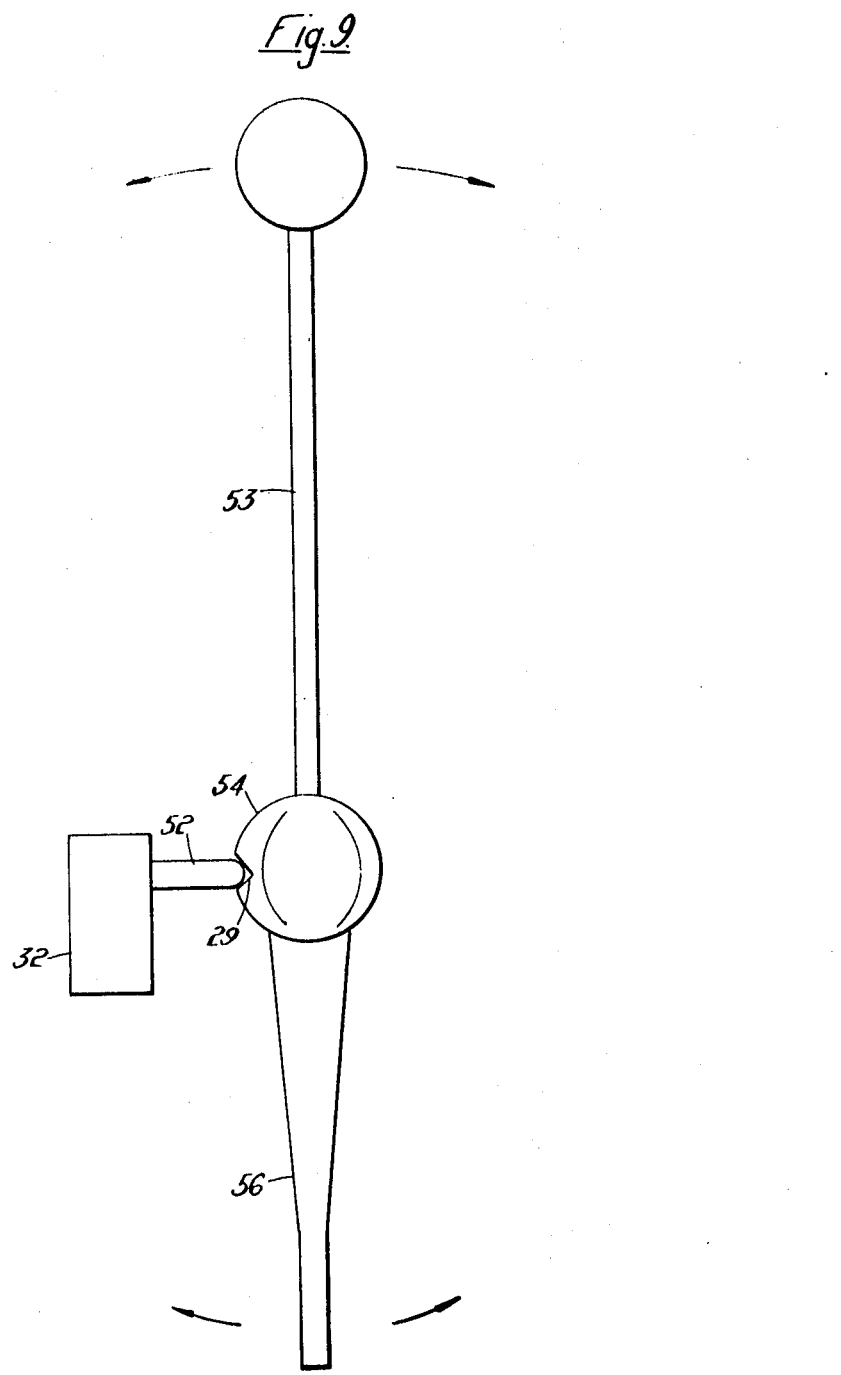

3,605,962
ELECTRIC CLUTCH AND ENGINE GOVERNOR CONTROLS FOR POWER TAKE-OFF
Edwin James Maynard, Thornhill, Southampton, England, assignor to A. C. Morrison (Engineers) Limited, Southampton, England
Filed Dec. 29, 1969, Ser. No. 888,353
Claims priority, application Great Britain, Oct. 22, 1969, 51,831/69
Int. Cl. F16d 47/00
U.S. Cl. 192—.092          5 Claims

ABSTRACT OF THE DISCLOSURE

An auxiliary power take-off apparatus for use with an internal combustion engine comprising an electromagnetic clutch through which a drive is transmitted from the engine to a take-off shaft, a governor driven by the take-off shaft, a control device movable into and out of an operative position and responsive to the governor, a setting device movable to set the control in and out of an operable position, the control device having a cam element engageable with the fuel intake control of the engine in the operative position, and an electric circuit energised by a battery or generator current and including a master switch, and an electric element of the clutch and of the setting device. A locking device responsive to gear ratio change in the vehicle drive transmission and actuating a switch in said circuit to break the circuit when the transmission is not in neutral condition.

BACKGROUND OF THE INVENTION

Field of the invention

This invention relates to a governed power take-off apparatus for internal combustion engines, and more particularly to such take-off apparatus in which the speed of the driven part of the apparatus is controlled within predetermined limits. The apparatus is primarily for use where the engine is a prime mover of a vehicle or machinery and the take-off drive is used to drive other apparatus normally when the engine is not being operated in its main drive role. The apparatus can be used for a variety of purposes such as the drive to the refrigerating or cooling apparatus of an ice cream vending vehicle where the engine is normally used as the prime mover of the vehicle. It can however be used as a direct mechanical drive for pumps of fire engines or land draining vehicles for example, or for driving electric generators for charging electric batteries or operating electric equipment such as hedge clippers, drilling machines or saws. The apparatus may drive an alternator or generator for A.C. or D.C. electric current supply respectively.

DESCRIPTION OF PRIOR ART

Normally in a self propelled vehicle, the engine is used to drive the vehicle and is therefore operated through its full speed range and is not governed. When the take-off apparatus is to be driven the engine speed is required to be controlled within predetermined limits at all times including when the load on the take-off varies. For example the apparatus may be required to drive an alternator carried by the vehicle to produce an electric current at say 400–420 volts, 50 c./s., three-phase at 1500 r.p.m., preferably running automatically and subject to large variations as when starting up and stopping electric motors or varying the load on the motors while they are running.

The main object of the invention is to produce a power take-off apparatus for assembly with an internal combustion engine, e.g. two stroke or four stroke, and which is adaptable to different engines.

SUMMARY

According to the present invention a governed auxiliary power take-off apparatus for use with an internal combustion engine comprises an electromagnetic clutch having a driving element drivable by the engine, a power take-off shaft coupled to the driven clutch element, a governor responsive to the speed of rotation of the take-off shaft, a control device responsive to the governor and operatively engageable with the engine fuel input apparatus, an electromagnetic setting device operable to render the control device operable or inoperable, and an electric circuit energised by a source of electric current and including an actuating switch and the energiseable elements of the clutch and setting device, the arrangement being such that when the power take-off apparatus is assembled to the engine, actuation of the switch to complete the electric circuit will cause the electromagnetic elements of the clutch and setting device to operate to impart a drive to the take-off shaft and to connect the control device operatively to the engine fuel input apparatus and the governor will operate to maintain the engine and take-off shaft speeds within predetermined limits.

The control device in a preferred construction comprises a cam movably mounted on the setting device and operatively connected to the governor and in the operable position its cam surface is maintained in engagement with an element of the engine fuel input apparatus.

A lost-motion device may be provided in the means actuating the engine fuel input and operable when the control device is inoperative to permit normal control of the engine fuel input apparatus and when the control device is operative permits the cam to actuate the fuel input apparatus within the limits of the lost motion whereby the normal fuel input apparatus control is rendered inoperative.

The setting device preferably comprises a setting element operatively connected to an electromechanical device in the circuit by which it is movable between operative and inoperative positions, a lever pivoted with respect to the setting element and carrying a cam operatively engageable with an element of the fuel input apparatus and, spaced therefrom, operatively connected to an element movable by the governor.

In one preferred construction a safety device is provided comprising a microswitch in the circuit operatively connected to a first locking element and a second locking element connected to a device associated with normal engine running, the two locking devices being interengaged to dispose the microswitch to permit energisation of the circuit and disengaged by movement of the device associated with normal engine running thereby opening the microswitch to break the circuit.

The electromagnetic clutch may be drivingly coupled to the crankshaft at either end of the engine or to a shaft in a gear box driven by the engine. With four stroke petrol engines having a carburetor fuel supply the control device is preferably coupled to the throttle control of the carburetor and with two stroke diesel engines having fuel injectors supplied from a fuel pump the control device is preferably coupled to the pump.

In order that the invention may be more fully understood, some embodiments in accordance therewith will now be described by way of example with reference to the accompanying drawings, in which:

BRIEF DESCRIPTION OF THE DRAWINGS

FIG. 1 is a front view of a conventional internal combustion engine showing the auxiliary power take-off apparatus assembled therewith;

FIG. 2 is a side view of the engine and take-off apparatus looking from the left in FIG. 1;

FIG. 3 is a plan view of the engine and apparatus of FIGS. 1 and 2;

FIG. 4 is an enlarged side elevational view of the setting device of the engine of FIGS. 1 to 3;

FIG. 5 is an enlarged front elevational view of the control device of the engine of FIGS. 1 to 4;

FIG. 6 shows a safety device for use with the engine of FIGS. 1 to 5;

FIG. 7 is an electric circuit diagram showing the circuit used in the apparatus of FIGS. 1 to 6;

FIG. 8 is a plan view similar to FIG. 3 of an alternative construction; and,

FIG. 9 shows diagrammatically to an enlarged scale another form of safety device.

In the drawings the same references are used to designate the same or similar parts.

DESCRIPTION OF PREFERRED EMBODIMENTS

Referring to FIGS. 1 to 6, these show a governed auxiliary power take-off apparatus for use with an internal combustion engine shown generally at A with the axis of its crankshaft at 1a and having the usual driving belt 1b round a pulley 1c on the crankshaft which drives the fan 1d and battery charging dynamo 1e. Fast on the crankshaft at the front end of the engine as seen in FIG. 1 is the driving element of an electromagnetic clutch 1 which is therefore driven by the engine. The driven clutch element 4 drives a belt 3 which passes round a pulley 2 to drive the power take-off shaft 5. The belt 3 may be a toothed belting passing round a toothed pulley 2 and clutch driven element 4 or these parts may be replaced by another suitable drive such as a chain and sprocket drive.

The shaft 5 is mounted in bearings 6 fast with the engine and as shown is parallel to the longitudinal axis of rotation of the engine crankshaft but this take-off shaft may be at any angle to the engine appropriate adjustment being made to the drive 2, 3, 4 for this purpose.

The shaft 5 has mounted thereon a pulley 7 and through a universal coupling 8, 9 drives a shaft 10 by which a drive is transmitted to a suitable apparatus.

Mounted on the engine is a governor 11 having a drive shaft carrying a pulley 7a fast thereon which is coupled by a belt 12 to the pulley 7 to drive the governor, or any other suitable drive such as a sprocket drive may be employed.

The governor 11 is coupled to an electromagnetic setting device which is operable to render a control device to be described operable or inoperable. The control device is responsive to the governor and in the operating position is engaged with the engine fuel input apparatus which in the drawings, being a petrol engine, is the throttle arm 24 of the carburetor 24a.

The control device (FIG. 5) comprises a cross lever 13 pivoted on the plunger 16 of the setting device to be described and is coupled by a rod 15 fitting with ball joints to the arm 15a which is moved in the vertical plane through an arc to rock the lever 13. The lever is pivoted at its central portion to a slotted pivot plunger 16 on a pin 17 in a slot in the plunger. The end of the lever 13 opposite to the rod 15 carries an angular faced cam 22 which in the operative position bears on or engages a roller or pin 23 fixed to the throttle lever 24 of the carburetor.

The setting device 14 in FIG. 4 comprises a casing or like mounting 21 to which is pivoted at 18a a lever 18 connected at one end to the lower end of the plunger 16 to permit angular movement with respect thereto, and at the other end is similarly connected to the lower end of a solenoid armature 20 or plunger, the solenoid 19 being mounted on the top of the case 21 with the plunger 20 protruding down therethrough. When energised, as will be explained, the plunger 20 is drawn up into the solenoid body causing the attached lever 18 to pull down the slotted pivot plunger 16 and in turn the cross lever 13 which being held by the ball joint and rod 15 to the governor arm 15a causes the other end of the cross lever to be depressed. Thus when the setting device is actuated as will be explained, by energising the solenoid 19, the plunger 16 drops carrying with it the cross lever 13 so that the angular face 22a of the cam 22 engages the top end of the throttle lever 24 of the carburetor and preferably a roller on a pin 23 thereon.

The carburetor lever 24 is maintained by a spring 24b in the normally closed position, i.e. the idling position of the engine, and when the vehicle is being driven on the road operation of the vehicle accelerator pedal causes a downward pull on the rod 23b and the slotted section 23a secured thereto thereby depressing the lever 24 and the spring 24b maintains the pin 23 in permanent engagement with the top of the slot 23c in the portion 23a. This slot with the pin 23 represents a lost motion which comes into operation when the power take-off apparatus of the invention is actuated so that the governor 11 controls the speed of the engine and the accelerator pedal rod 23b is rendered inoperative.

When the plunger 16 is depressed and the cam surface 22a engages the roller on the pin 23 then rocking of the arm 13 by the governor rod 15 causes the lever 24 to be depressed and to be held against the face 22a by the spring 24b and thereby governs the engine speed.

With many vehicles, the engine is in a confined space which necessitates the governor with the lever 18 and solenoid being in an accessible part adjacent the engine but sufficiently far removed from the engine exhaust to prevent it being overheated. Moreover the plunger 16 being lighter than the plunger 20 is maintained by the weight of the plunger 20 in the inoperative position but this if desired could be augmented by a spring which would normally maintain the plunger 16 in the inoperative position and it could be drawn down by a coaxial plunger 20 in the solenoid 19 beneath the plunger 16 thereby omitting the construction of the lever 18.

The electromagnetic element of the electromagnetic clutch 1 is shown in FIG. 1 as being coupled to the engine crankshaft but it may be coupled to the part of the clutch imparting the drive to the shaft 5. The electromagnetic element of the clutch 1 and the winding of the solenoid 19 are coupled in an electric circuit shown in the line diagram of FIG. 7. The power used for this circuit is taken from the vehicle battery 36a or a generator, not shown, may be used which could be the generator 1e (FIG. 1) and may be 12 or 24 volts D.C. This current is fed into the circuit through a key switch 34 having a master switch 36 with a third contact 35, the switch 34 having a normal closed position to close the contacts 36 and a spring loaded position normally keeping the contact 35 open but which can be closed to complete the contact 35 to initiate the operation of the apparatus of the invention. The output terminal of the switch 36 is coupled to normally open relay contacts 33 of which three are shown which act in unison. Of the three relays 33 the output terminal 33a of the top relay is connected to the winding 25 of the relay operating rod 25a and then to earth. The contact 35 is connected to this lead 33b as is the top relay terminal 33a. Thus when the master switch is closed and the contact 35 is closed, current will pass through 33b to the winding 25 thereby moving the member 25a to close all three contacts 33a. The other contacts 33a are connected respectively to the electromagnetic element 37 of the clutch 1 and to the winding 39 of the solenoid 19 causing the drive to operate. This will continue until the drive is disconnected by switching off the switch 36 or operating the microswitch 32 to be described; when the drive is operating, the throttle pedal rod 23b of the vehicle can be locked by another solenoid, not shown, also connected to the contacts 33a thereby operating a locking mechanism not shown, thus preventing the drive being over-driven by the driver.

To prevent the vehicle being driven when the drive is engaged or operating, the electric circuit of FIG. 7 is controlled through a safety device fitted to the gear change of the vehicle so that only when the gears are in neutral position will the current pass through the coil 25.

Referring to FIG. 6, this shows diagrammatically the steering column 26a of the vehicle with its steering box 26b with the gear lever rod 28 of a conventional steering column gear change control. Fast with the column 28 is a cam segment 27 as by welding and this cam has a V notch 29 which in the neutral position of the gear box coincides with a roller 30 on an arm 31 of the microswitch 32 which is thus in the closed position allowing the current to pass to the relay coil 25. Any movement of the gear lever from the neutral position moves the notch 29 away from the roller 30 thereby lifting the lever 31 which opens the contacts of the microswitch 32 so that only when the gear is in the neutral position will the circuit be energised and when the vehicle is driven on the road in gear it is impossible to engage the auxiliary take-off drive of the apparatus of the invention.

Referring to FIG. 8, this shows an alternative construction again with a petrol engine fed with fuel from a carburetor employing the apparatus but with the electromagnetic clutch 1 of FIG. 1 replaced by an electromagnetic clutch 43 on the driven shaft of the engine in the casing 41, the clutch having a pulley 44 driving a belt 45 which drives the pulley 46 coupled directly to the governor 11 and the universal joint 47, 48 which drives the output shaft 49, 51. The governor is connected to the cross lever 13 through the rod 15 and a suitable operating connection shown diagrammatically at 52. In this construction the electromagnetic element of the clutch may be associated with the pulley 44 or the pulley 46.

Referring to FIG. 9, this shows an alternative safety device where the gear lever is of the independent ball joint type in which the ball joint 54 is mounted on the gear box casing to move in any direction when operated by the handle 53 to move the gear engaging rod 56. The notch 29 is provided in the ball 54 and in the neutral position coincides with a rod 52 which actuates the microswitch 32.

A protection device may be incorporated for tripping the electric circuit of the take-off drive apparatus which would automatically break the circuit when the engine speed reaches a predetermined value for example 2000 r.p.m., or higher. Such a device could be on the pulley 4 of the electromagnetic clutch 1 or anywhere in the take-off drive so that it only controls the engine speed when the engine is not employed to drive the vehicle on the road. The protection device would consist of a rotating element having a centrifugal weight which when the engine speed reaches the predetermined value will fly out and engage an element which will trip the microswitch 32 or a similar switch.

Normally if the shaft 10 or 51 meets with a load which is greater than the engine or the power take-off apparatus is designed to withstand, the engine will slow down and eventually stall but a torque unloading device may be incorporated in this drive which automatically becomes free when the load on the shaft 5 or 49 reaches a predetermined limit.

The governed power take-off at the shaft 10 or 51 can be used for any purpose for example a direct mechanical drive to an apparatus such as a pump for example on a fire engine, or to drive an alternator to produce A.C. current or a generator to produce D.C. electric current. Such an apparatus can be used for a wide variety of purposes including the refrigeration equipment of an ice cream van which is fed by current from an alternator, or for providing the current for filming or projecting films or broadcasting from mobile broadcasting vehicles, or to produce current for generating electric batteries so that the vehicle becomes a mobile charging station or it could be used to provide the power for a communications vehicle.

It will be seen that by virtue of the invention a simple governed power take-off is provided which can be quickly assembled to the prime mover of a vehicle and provide a power take-off. The apparatus is simple in operation and easily controlled by the driver of the vehicle.

I claim:

1. An auxiliary power take-off apparatus for use with an internal combustion engine comprising an electromagnetic clutch, a driving element of said clutch drivable by said engine, a power take-off shaft coupled to a driven element of said clutch, a governor responsive to the speed of rotation of said take-off shaft, a control device responsive to said governor and operatively engageable with fuel input apparatus of said engine, an electromagnetic setting device operable to render said control device operable or inoperable, and an electric circuit energised by a source of electric current and including an actuating switch and the energiseable elements of said clutch and said setting device, the arrangement being such that when the power take-off apparatus is assembled to the engine, actuation of said switch to complete said electric circuit will cause said electromagnetic elements of said clutch and said setting device to operate to impart a drive to said take-off shaft and to connect said control device operatively to said engine fuel input apparatus and said governor will operate to maintain said engine and take-off shaft speeds within predetermined limits.

2. An auxiliary power take-off apparatus according to claim 1, wherein said control device comprises a cam movably mounted on said setting device and operatively connected to said governor and in the operable position its cam surface is maintained in engagement with an element of said engine fuel input apparatus.

3. An auxiliary power take-off apparatus according to claim 1, wherein a lost motion device is provided in the means actuating said engine fuel input and operable when said control device is inoperative to permit normal control of said engine fuel input apparatus and when said control device is operative permits said cam to actuate said fuel input apparatus within the limits of said lost motion whereby the normal fuel input apparatus control is rendered inoperative.

4. An auxiliary power take-off apparatus according to claim 1, wherein said setting device comprises a setting element operatively connected to said electromagnetic setting device in said circuit by which said setting element is movable between operative and inoperative positions, a lever pivoted with respect to said setting element and carrying a cam operatively engageable with an element of said fuel input apparatus and, spaced therefrom, said lever operatively connected to an element movable by said governor.

5. An auxiliary power take-off apparatus according to claim 1, wherein a safety device is provided comprising a microswitch in said ciricuit operatively connected to a first locking element and a second locking element connected to a device associated with normal engine running, said two locking devices being interengaged to dispose said microswitch to permit energisation of said circuit and disengaged by movement of said device associated with normal engine running thereby opening said microswitch to break said circuit.

References Cited

UNITED STATES PATENTS 3,207,277  9/1965  Spence _____ 192—.096
3,323,621  6/1967  Peras _____ 192—.08

BENJAMIN W. WYCHE, Primary Examiner

U.S. Cl. X.R.

192—.08, .062, .096, 3.56; 74—874